(12) United States Patent
DeCusatis et al.

(10) Patent No.: US 8,102,599 B2
(45) Date of Patent: Jan. 24, 2012

(54) FABRICATION OF OPTICAL FILTERS INTEGRATED WITH INJECTION MOLDED MICROLENSES

(75) Inventors: Casimer M. DeCusatis, Poughkeepsie, NY (US); Lawrence Jacobowitz, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/603,569

(22) Filed: Oct. 21, 2009

(65) Prior Publication Data

US 2011/0090570 A1    Apr. 21, 2011

(51) Int. Cl.
*G02B 27/10* (2006.01)
(52) U.S. Cl. ............................................ 359/620
(58) Field of Classification Search .......... 359/619–626; 348/335, 340
See application file for complete search history.

(56) References Cited

U.S. PATENT DOCUMENTS

| | | | | |
|---|---|---|---|---|
| 5,298,366 | A | 3/1994 | Iwasaki | 430/321 |
| 5,629,800 | A | 5/1997 | Hamblen | 359/565 |
| 6,171,885 | B1 | 1/2001 | Fan | 438/70 |
| 6,410,213 | B1 | 6/2002 | Raguin | 430/321 |
| 6,482,669 | B1 | 11/2002 | Fan | 438/70 |
| 6,822,799 | B2 | 11/2004 | Kitamura | 359/622 |
| 6,909,554 | B2 | 6/2005 | Liu | 359/626 |
| 7,009,772 | B2 | 3/2006 | Hsiao | 359/619 |
| 7,295,375 | B2 | 11/2007 | Jacobowitz et al. | |
| 7,372,497 | B2 | 5/2008 | Weng | 348/340 |
| 7,399,421 | B2 | 7/2008 | Jacobowitz | 216/24 |
| 7,486,854 | B2 | 2/2009 | Van Ostrand | 385/31 |
| 7,515,357 | B2 | 4/2009 | Segawa | 359/740 |
| 7,518,676 | B2 | 4/2009 | Minoura | 349/113 |
| 7,522,314 | B2 | 4/2009 | Atkins | 358/3.27 |
| 7,524,770 | B2 | 4/2009 | Park | 438/713 |
| 7,531,104 | B1 | 5/2009 | Hwu | 216/80 |
| 2002/0104823 | A1 | 8/2002 | Cunningham | 216/24 |
| 2003/0112523 | A1* | 6/2003 | Daniell | 359/626 |
| 2005/0242271 | A1* | 11/2005 | Weng et al. | 250/208.1 |
| 2007/0029277 | A1* | 2/2007 | Jacobowitz et al. | 216/24 |

OTHER PUBLICATIONS

Victor Lien et al, "Microspherical surfaces with predefined focal lengths fabricated using microfluidic capillaries", Applied Physics Letters, vol. 83, No. 26, pp. 5563-5565 (2003).

* cited by examiner

*Primary Examiner* — Alicia M Harrington
(74) *Attorney, Agent, or Firm* — Steven Chiu; Ido Tuchman

(57) ABSTRACT

Injection molding of monolithically integrated optical components is disclosed. In one embodiment, an injection molding system includes a moldplate having an array of specially designed cavities. In at least one cavity, different types of photo-curable optical materials are injected in an ordered sequence. In a first instance, a lens material is injected into the cavity and subsequently cured to form a predetermined lens element at the base of the cavity. In a second instance, a filter material is injected into the cavity above the already formed lens element. The filter material is also cured, and an optical filter is formed stacked onto the lens element and contained within sidewall of the cavity. In this manner, a complex optical component having an optical filter automatically aligned with, and monolithically integrated into, a lens element is readily formed in a single injection molding process.

24 Claims, 7 Drawing Sheets

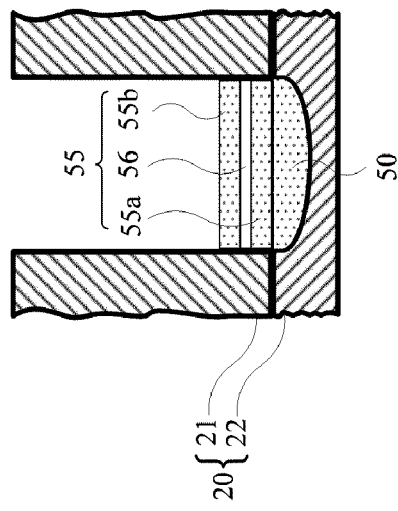
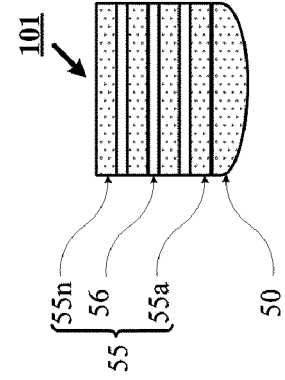
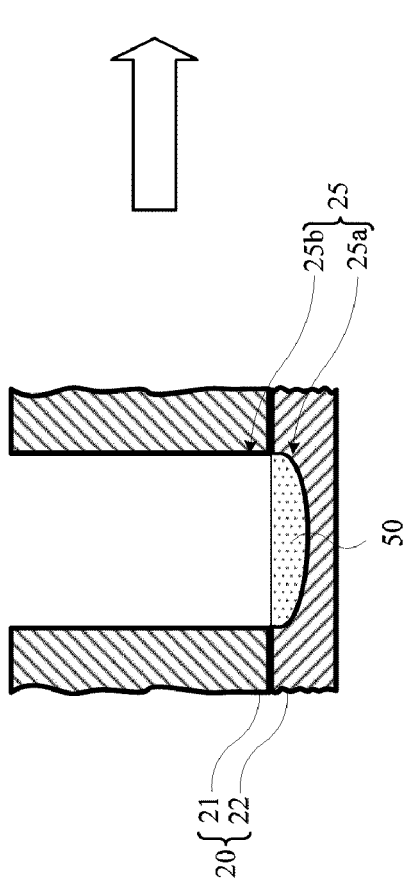
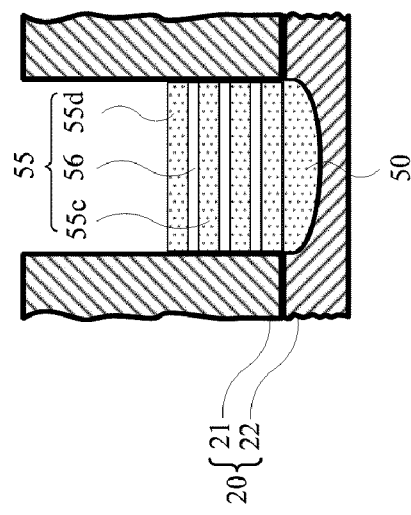
FIG. 3A
FIG. 3B
FIG. 3C
FIG. 3D

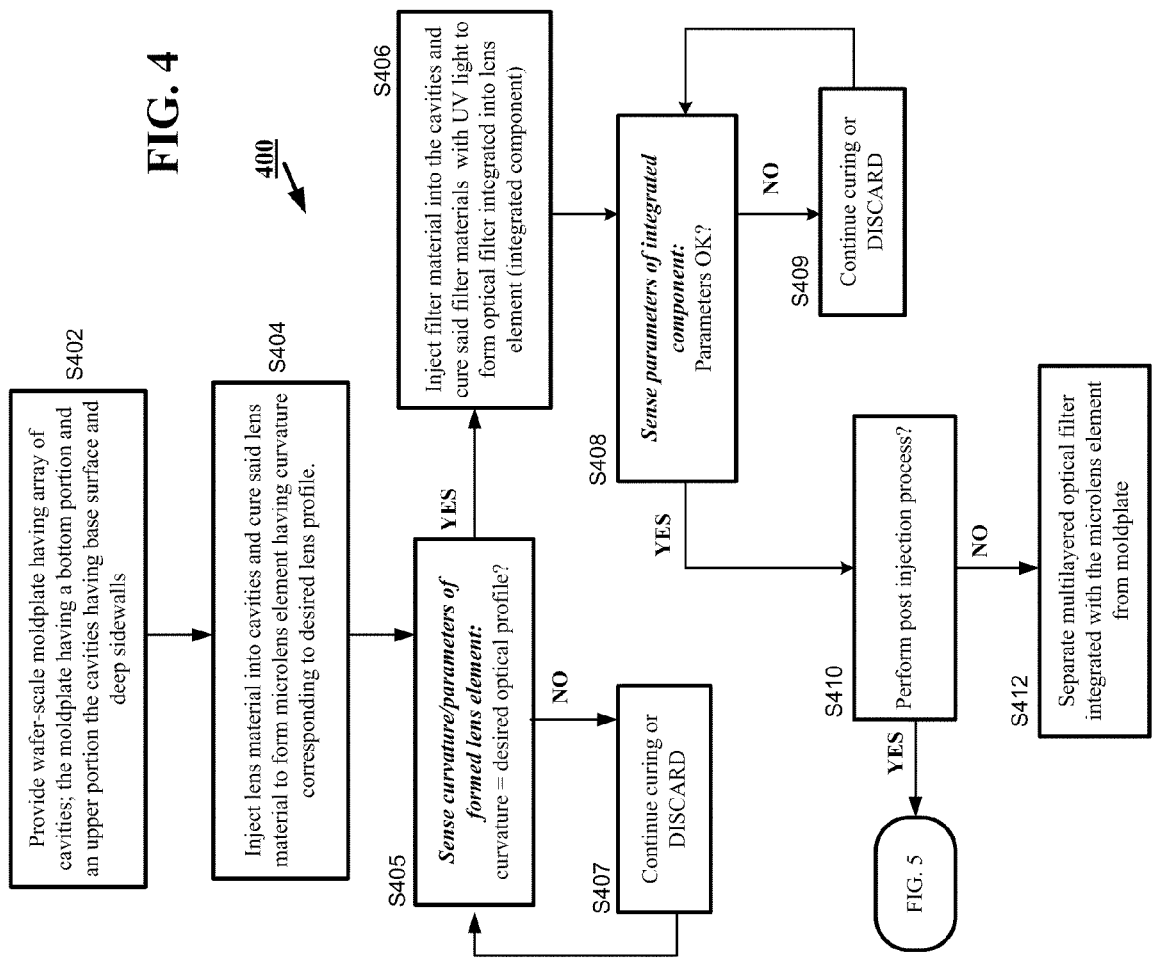

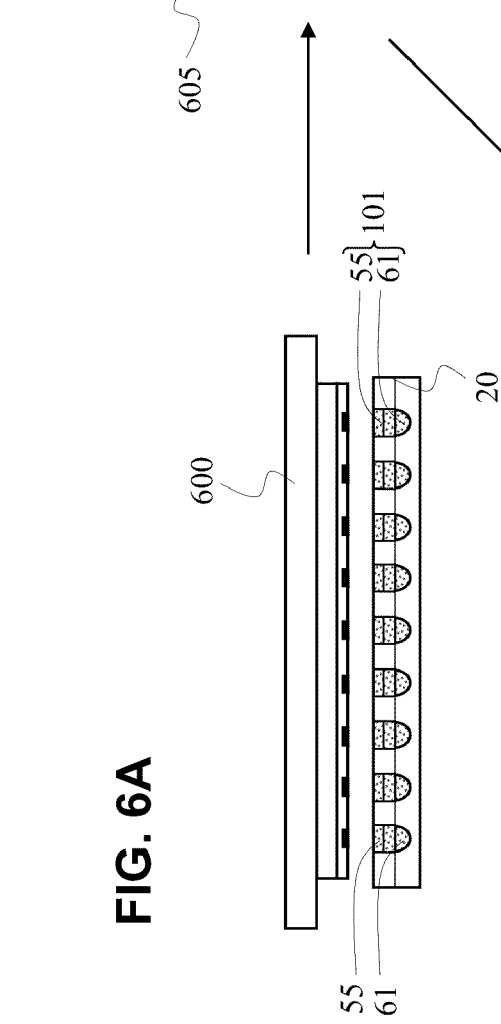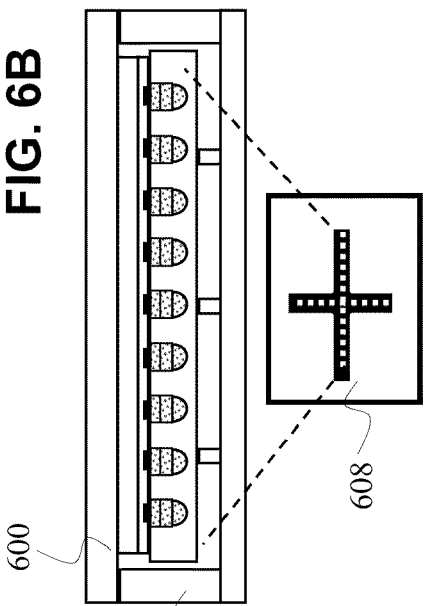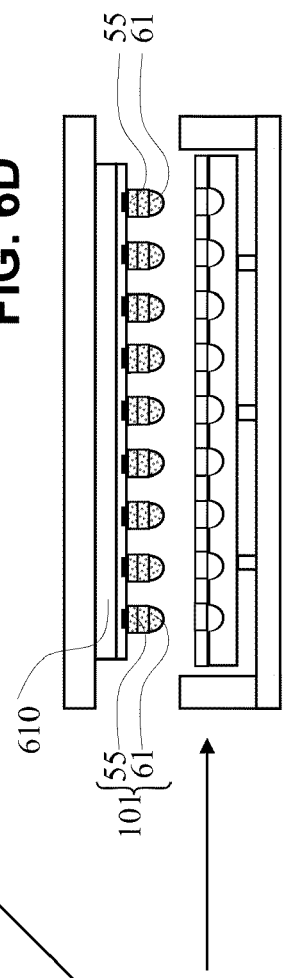
FIG. 6A  FIG. 6B  FIG. 6C  FIG. 6D

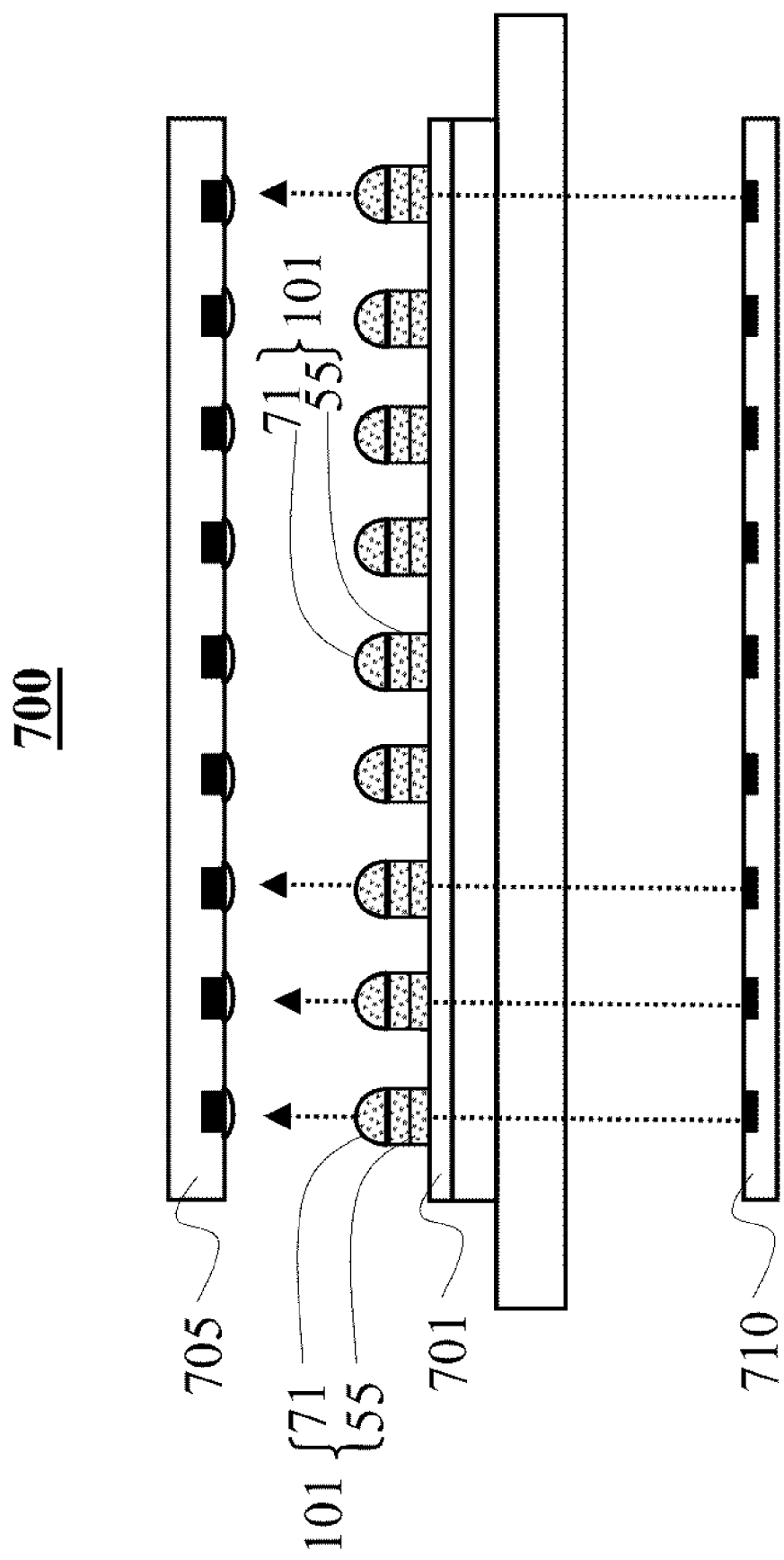

FABRICATION OF OPTICAL FILTERS INTEGRATED WITH INJECTION MOLDED MICROLENSES

CROSS-REFERENCE TO RELATED APPLICATIONS

This application is related to copending applications U.S. patent application Ser. No. 12/603,565 and U.S. patent application Ser. No. 12/603,567, filed concurrently herewith. The disclosure of the related applications is incorporated herein by reference in its entirety for all purposes.

FIELD OF INVENTION

The present invention relates to injection molding of optical components, and more specifically, to a method and system for injection molding optical filters integrated with lens elements. The optical components are preferably in the micro or nanometer scale.

BACKGROUND OR RELATED ART

In the current state of the art, optical components are typically manufactured as individual components and subsequently assembled and integrated into functional detecting (focusing) and/or displaying devices. For example, conventional solid-state image detectors which are either charge-coupled devices (CCD) or complementary metal-oxide semiconductor (CMOS) photodiodes are typically manufactured as array structures which comprise a spectrally photosensitive layer assemble below one or more layers patterned in an array of color filters and above the array of color filters resides an array of microlens elements.

One example of conventional color image display is the digital light processor (DLP) system developed by Texas Instruments. In the DLP system, light is projected onto a deformable micro-mirror device (DMD) by a color filtered array of light emitting diodes (LEDs). Under digital control circuitry, the DMD sequentially displays different color segments of an image. Red, green and blue components of an image are displayed when the DMD is illuminated by one of a red, green or blue LED through a corresponding one of a red, green or blue filter. In order to obtain appropriate image brightness and color quality, arrays of LEDs must be focused onto the DMD with the use of corresponding focusing and filtering micro-optical elements. These micro-sized lens and filter elements, which are in the order of tens of microns in thickness and can be as small as 10 microns in diameter, are separately layered onto and aligned with the LEDs.

In the field of fiber-optic communications, appropriate focusing elements are routinely combined with wavelength selective optical filters, wavelength splitters, optical couplers, waveguides and the like. Because wavelength selective elements, optical couplers and the like are typically manufactured as separate parts, assembling and aligning these into high-precision optical components represents a major hurdle.

It is evident therefore, that separately fabricating highly precise optical elements and then aligning with LED, CCD, CMOS or wavelength selective devices is a difficult, costly and time-consuming process. FIG. 1A graphically illustrates an example of a Prior Art process for the formation of a microlens array and the assembly and alignment of said microlens array with a color filter array and an image sensor substrate. The formation of a microlens array is illustrated at 100, in which a planar film of a photoimageable material such as a photoresist is photolithographically patterned such that exposure to actinic radiation and subsequent development of the photoresist forms a two-dimensional array of mesas which can be thermally reflowed (melted) into planoconvex microlenses under surface tension forces. An exploded assembly view is shown in 110, indicating the relative position and alignment of the microlens array elements to an underlying array of red, green, blue color filters and further underlying sensor substrate including an array of image sensors. By electronically amplifying and combining the outputs of the red, green and blue signals detected by the image sensors, color image formation is achieved. One of the problems with the above-describe process is that topographical variations and misalignment caused by the process assembling separate optical components with the semiconductor device result in optically generated cross-talk and/or poor resolution imaging.

In view of the foregoing and other considerations, it would be advantageous to develop improved techniques that enable the integration of different optical components preferably into a single one, thereby overcoming the problems caused by separately fabricating such optical components and subsequently assembling and aligning them.

SUMMARY

An aspect of the present invention is an apparatus and method for high-volume manufacturing of injection molded optical elements and spectral filtering devices integrated into a single device. Thus replacing two components with a single component, reducing overall cost, and eliminating a separate alignment step between, for example, a lens and a filter.

A further aspect of the present invention is the manufacturing of microlenses and color filter integration into a single micro-optical device. A still further aspect of the present invention is an apparatus and method for the lithographically precise alignment of arrays of integrated micro-optical elements to semiconductor structures, such as CCD, CMOS or LED arrays, and, the attachment thereto. In accordance with another aspect of the present invention, there is provided a manufacturing method process and an apparatus for such a method which minimizes the number and task-times and reduces production costs in the fabrication of color imaging devices.

In accordance with at least one embodiment, a method for fabricating optical filters integrated with injection molded lens elements is disclosed. The method includes: providing a moldplate having an array of cavities where each of the cavities has a base surface and deep sidewalls, the base surface has a geometric profile corresponding to a predetermined lens profile. A sequenced injection molding process includes: injecting a lens material into at least one cavity of the array of cavities such that the lens material forms a lens element having the predetermined lens profile; and injecting a filter material into the at least one cavity and above the lens material such that the filter material forms an optical filter stacked onto the lens element. In this manner, the optical filter is automatically aligned with and monolithically integrated into the lens element.

Preferably, injecting the filter material includes injecting a plurality of layers of the filter material such that the optical filter includes a multilayered filter having two or more layers of the filter material. In such a multilayered filter, each layer may be configured to serve as a monochromatic filter responsive to a different wavelength range. For example, the multilayered filter may include an RGB (red, green and blue) filter configured to selectively filter light of RGB wavelengths. In some embodiments, an optical buffer layer may be formed above the lens element. Fore example, the optical buffer layer can be formed in one or more of (i) between the lens element and said multilayered filter, (ii) between the layers of the multilayered filter, and (iii) above the layers of the multilayered filter.

A preferred method of forming the lens element includes curing the lens material contained in the at least one cavity with actinic radiation such that the formed lens element substantially matches the predetermined lens profile. Similarly, the optical filter is preferably formed by curing the injected lens material with actinic radiation such that the optical filter is formed with the deep sidewall of said at least one cavity and above said lens element. Actinic radiation includes ultraviolet (UV) light, and curing includes exposing the lens and filter materials, respectively, to low intensity UV light in a sequenced order.

Preferable lens materials include a polymer material or a photopolymerizable material, and preferable filter materials include polymer materials doped to serve as a chromatic filter. Detailed description of lens and filter materials is provided.

An injection molding system for injection molding of optical filters integrated with lens elements is also disclosed. The injection molding system comprises: a moldplate having an array of cavities, each of said cavities having a base surface and deep sidewalls, said base surface having a geometric profile corresponding to a predetermined lens profile; an injection device configured to inject a lens material and a filter material into at least one cavity of said array of cavities of said moldplate, and a curing device configured to cure the injected lens material and the injected filter material such that the cured lens material forms a lens element having said predetermined lens profile and the cured filter material forms an optical filter stacked onto the lens element in said at least one cavity, wherein said optical filter is aligned with and monolithically integrated into said lens element.

Preferably, the curing device includes a source of actinic radiation, which is configured to cure said lens and filter materials in an ordered sequence such that the curing device first cures the lens material and later cures the filter material injected into the cavities with a low-intensity UV light.

Lastly, an array of integrated injection molded micro-optical elements is disclosed. The array of micro-optical elements comprising: an array of microlens elements formed of a first polymer material; and an array of multilayered optical filters formed of a second polymer material, said array of multilayered optical filters being aligned with and monolithically integrated into said array of microlens elements, wherein each of the layers in said array of multilayered optical filters contains the second polymer material configured to block a different range of wavelengths.

Other embodiments and advantages thereof may be readily inferred by persons of ordinary skill in the art, when reading the detailed description of the disclosure in reference to the attached drawings.

BRIEF DESCRIPTION OF THE SEVERAL VIEWS OF THE DRAWINGS

FIG. 3 graphically illustrates sequence steps of an exemplary fabrication process for building integrated optical components. An example of optical filters integrated into lens elements is illustrated.

FIG. 4 shows a flow chart illustrating example method steps for the fabrication of optical filters integrated into lens elements by an injection molding process, as contemplated by one embodiment of the present invention.

FIGS. 6A to 6D show a process sequence for alignment, clamp, transfer and separation of newly formed optical filters integrated into lens elements in the post injection process of FIG. 5.

FIG. 7 is an exemplary arrangement for testing newly formed optical filters integrated into lens elements.

DETAILED DESCRIPTION

Figure 1:
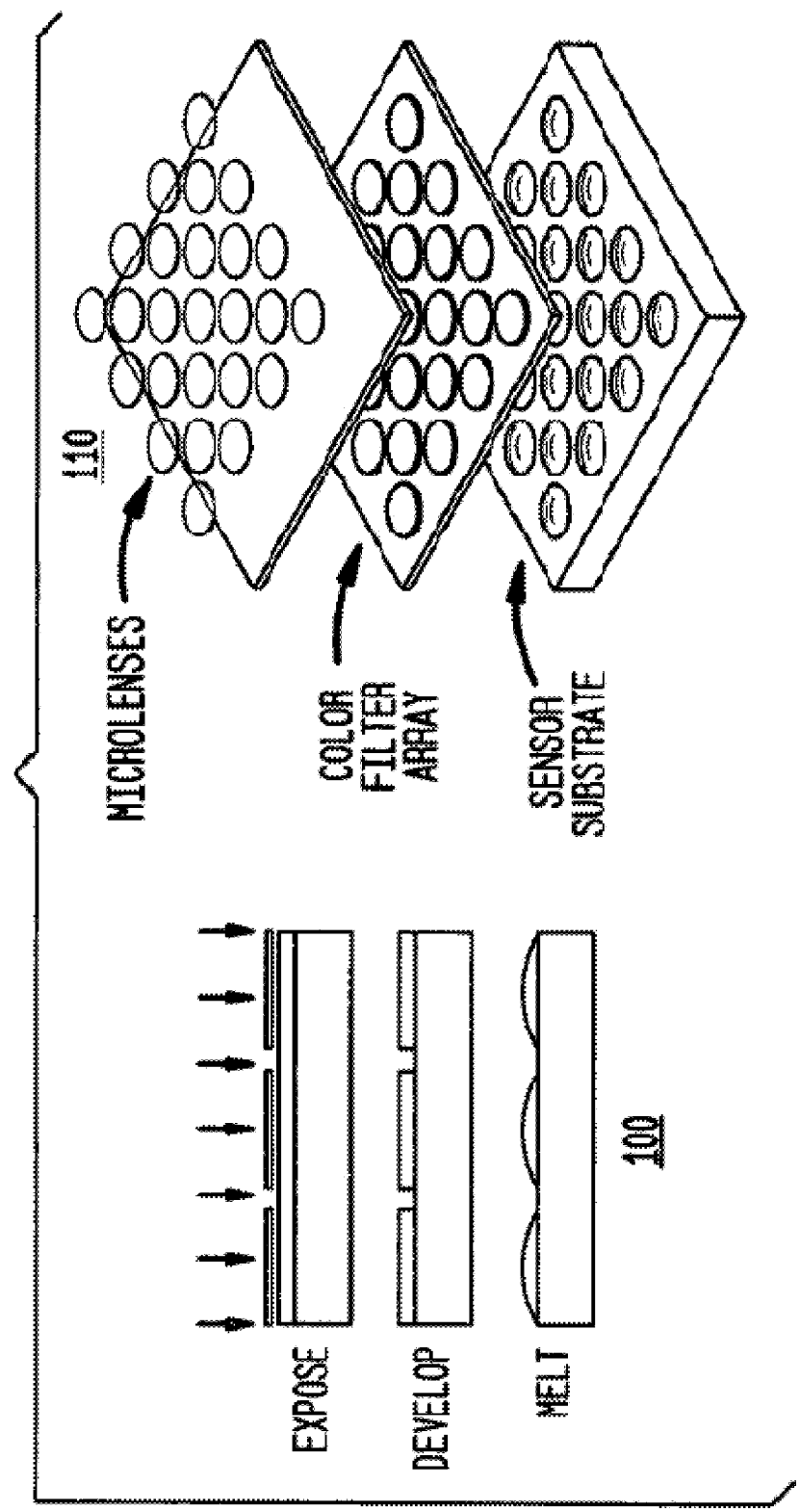
FIG. 1 illustrates a conventional Prior Art process for the formation of a microlens array and the assembly and alignment of the microlens array with a color filter array and an image sensor substrate.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification and claims, specify the presence of stated features, integers, steps, operations, elements, and/or components, but do not preclude the presence or addition of one or more other features, integers, steps, operations, elements, components, and/or groups thereof. In the following description, reference is made to the accompanying drawings where like reference numerals refer to like parts throughout the disclosure.

At least one embodiment of the present invention discloses a system and method for the formation of integrated optical elements, such as spectral filtering devices integrated into lens elements and the like, by an injection molding process. In particular, a method for manufacturing high-precision integrated optical elements with a multi-stage moldplate structure and a sequenced injection process is disclosed.

In accordance with at least one embodiment, the present invention enables the formation of high-precision integrated optical elements by sequentially injecting and curing optical material into selectively designed cavities of a moldplate. A possible ordered sequence for injection molding optical filters integrated with lens elements includes: providing a moldplate having an array of cavities, in which each of the cavities has a base surface and sidewalls, the base surface is selectively engineered with a geometric profile corresponding to a predetermined lens profile desired to be replicated. An injection sequence steps includes: a first step of injecting a lens material into at least one cavity of the array of cavities such that the injected lens material forms a lens element having the predetermined lens profile; a second step of injecting a filter material into the at least one cavity and above said lens material such that the filter material forms an optical filter stacked onto the lens element. In order to harden the injected material and form the lens element and optical filter, a sequenced curing step takes place subsequent to each injecting process. In this manner, the optical filter is automatically aligned with and monolithically integrated into the lens element.

Subsequent to the formation of the integrated optical components, the optical filter integrated into the lens element, may be separated from the moldplate and transferred onto active optoelectronic devices such as light pickup or light emitting means for operation and/or testing, as more fully discussed in the "Post-injection Processes" section described herein below.

The teachings of the present invention may be applicable to the manufacture of optical components in the micro and/or nanometer scale, such a microlenses, microfilters, nano-optical waveguides, spectral filters, fiber-optic mode-transformers, diffraction gratings, refractive or diffractive lenses, Fresnel zone plates, reflectors, and to combinations of such optical elements with other devices, including microelectromechanical systems (MEMS) and liquid crystal device (LCD) matrices for adaptive, tunable elements, and the like.

System for Fabrication of Injection Molded Micro-Optics

Figure 2:
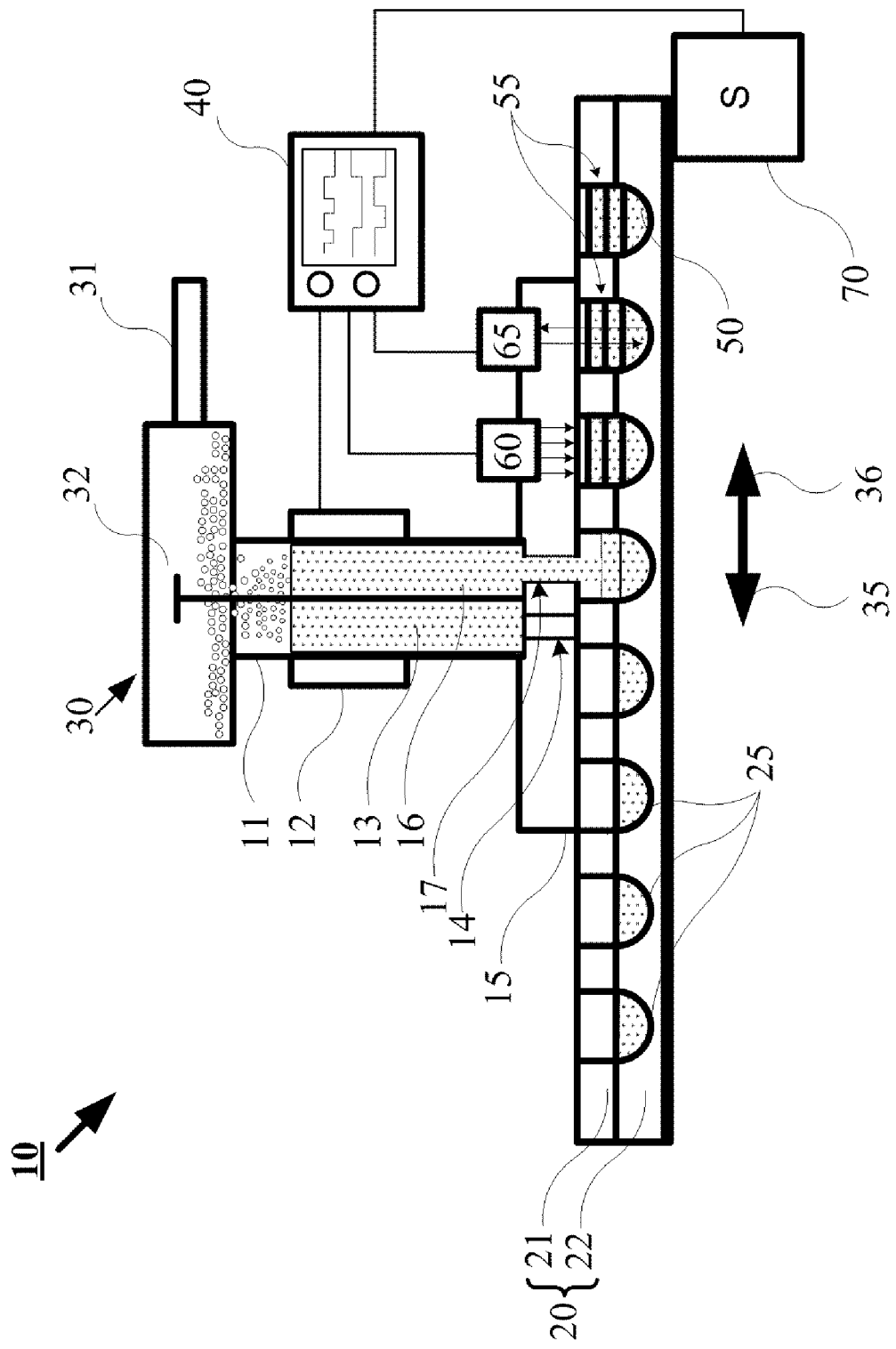
FIG. 2 is a schematic representation of an exemplary injection molding system, as contemplated by one embodiment of the present invention.

FIG. 2 is a schematic representation of an exemplary injection molding system 10 for use in the method, as contemplated by one embodiment of the present invention. Injection molding system 10 includes a moldplate 20, an injection machine 30 a control station 40, a curing device 60, a surface sensor 65, a filling platen 15, and a translation stage (S) 70. In operation, the various components of injection molding system 10 serve to form an optical filter 55 aligned with and integrated into a lens element 50.

The moldplate 20 includes a plurality of cavities 25. Each of the cavities 25 includes a base surface 25a and sidewalls 25b (see FIG. 3A). The base surface 25a is preferably designed with a geometric profile (e.g., shape, diameter, depth, curvature and the like) corresponding to a predetermined lens profile. Similarly, the sidewalls may be designed with predetermined diameters and depths corresponding to desired filter profiles. The thus designed cavities 25 are therefore configured to receive an appropriate lens material 13 within the base surface 25a and a filter material 16 within the sidewalls 25b. In this manner, complex integrated optical components can be readily formed within cavities 25, as more fully described below.

More specifically, in at least embodiment of the present invention (see FIGS. 2 and 3A), the physical profile (e.g. shape) of the lens element 50 is determined namely by the geometric configuration of base surface 25a of the cavity 25, while the physical profile of the optical filter 55 and the automatic alignment and integration of the optical filter 55 into the lens element 50 is achieved by the sidewalls 25b of the cavity 25. Accordingly, the base surface 25a can be specifically engineered to meet predefined parameters such as diameter, thickness, curvature, focal length and the like of lens element 50, in accordance with requirements of specific applications. For example, in accordance with embodiments of the present invention, it is possible to achieve optical lens elements 50 with predetermined profiles including aspheric, spheric, ellipsoidal, cylindrical paraboloidal, trapezoidal, rectangular, square, or other more complex profiles, by simply designing the base surface 25a of the cavities 25 with those predetermined profiles. It is also recognized that optical filters 55 of different thicknesses and spectral characteristics (e.g., responsive to a range of selective wavelengths) may be easily designed by building single-layer or multilayered optical filters 55 contained within the sidewalls 25b of the cavities 25.

To that end, each of the cavities 25 is preferably designed with a base surface 25a having the predetermined geometrical profile which substantially matches a predetermined optical profile of lens element 50 desired to be replicated in the injection molding system 10. Similarly, each of the cavities 25 is preferably designed with sidewalls 25b having the predetermined optical lens profile (e.g., depth and diameter) of the optical filter 55 desired to be aligned with and integrated into the lens element 50. Moreover, other parameters such the optical polymer viscosity, material composition, optical absorptivity and spectral transmissivity, rheologic and surface polarizability properties, and, dependence of these parameters on temperature can be adjusted for each of the lens elements 50 and/or optical filters 55 at the control of the optical designer and the manufacturer.

Continuing to refer to FIG. 2, the moldplate 20 can be fabricated from a monolithic piece of a selected material, or it can be fabricated as a composite device formed of a plurality of parts made of one or more selected materials. Moldplate fabrication processes and materials thereof are considered to be well known to persons of ordinary skill in the art. For example, U.S. Pat. No. 7,399,421 (hereafter "patent '421"), entitled "Injection Molded Microoptics" and assigned to the assignee of the present application, discloses preferred processes and materials for the fabrication of wafer-scale moldplates having an array of cavities. The entire disclosure of patent '421 is incorporated herein by reference for all purposes. The present invention, however, recognizes that the size of the cavities in the moldplates disclosed in patent '421 is not readily suitable for the injection molding of complex integrated optical components, such as optical filters 55 aligned with, and monolithically integrated into, lens elements 50 discussed in this application, due to the limited depth of those cavities. As a result, in at least one embodiment of the present invention, a moldplate 20 may be preferably fabricated with cavities 25 being at least 50% deeper than those described in patent '421.

One possible embodiment of a moldplate 20 is illustrated in FIG. 2, and additional details of a cavity 25 are illustrated in FIGS. 3A to 3C. In those figures, moldplate 20 is a multi-stage moldplate that includes a bottom portion 21 and an upper portion 22, which are separable form each other. The bottom portion 21 includes the previously-described base surface 25a, while the upper portion 22 includes the sidewalls 25b of cavity 25. A multi-stage moldplate having two physically separable portions may be preferable, for example, for purposes of separately cleaning and repairing these molds for reuse. In addition, a variety of bottom portions 21 may be designed with different cavity geometries corresponding to different lens element profiles. In this manner, only the bottom portion 21 would need to be exchanged when passing from the fabrication process of one type of lens element 50 to a different type. It may also be advantageous to construct the bottom portion 21 of a type of material(s) that would facilitate processes (e.g., reactive ion etching [RIE]) or the formation of high-precision geometric profiles.

Regardless of whether the moldplate 20 is formed of a single structure mold or a multi-stage mold, it would be preferable that the moldplate 20 includes a material having a coefficient of thermal expansion (CTE) that substantially matches the CTE of the lens material 13 and that of the filter material 16. Materials typically known for the fabrication of moldplate cavities include metals (e.g., molybdenum or nickel), silicon graphite, glass, polyimide or combinations thereof. For purposes of illustration, it is preferable that the CTE of the moldplate material be within a 5% of the CTE of the lens material 13 and/or filter material 16 such that under the curing effect of actinic radiation the lens material 13 and filter material 16 conform to the geometrical shape of the cavity 25 without prematurely dislodging from the moldplate material. More specifically, it is preferable that the CTE of the lens material 13 and filter material 16 and the CTE of the moldplate material differ by no more than 5%. In this manner, the lens and filter materials may conform to the exact geometric profiles of the moldplate cavities without shrinking away from the moldplate material and thus forming integrated optical components with highly precise dimensions.

In order to facilitate release of the lens material 13 and filter material 16 from the moldplate 20, a thin release layer can be coated on base surface 25a and sidewalls 25b of the cavities 25. Examples of well known release agents include waxes and poly(tetrafluoroethylene) (PTFE) coatings, but other release materials may also be suitable. For example, a class of materials capable of forming self-assembled monolayers (SAMs) is well known to form dense, highly ordered monolayer films on silica glass surfaces. Similar material can be used for metal surfaces. These self-assembled monolayers, or SAMs, form because of the tendency of trisilanols to form a tight silyl ether network with silanol groups on the glass surface and with silanol groups on neighboring molecules. The self-ordering films are formed because the close packing of long chain alkyl groups are attached to the trisilanols. For example, when a wet glass surface is dipped into a dilute solution of octadecyltriethoxysilane or octadecyltrichlorosilane, a well ordered monolayer film assembles on the glass surface. Subsequent baking or UV curing of the film makes a permanent bond of the film to the surface of the moldplate cavities. Because the end group on the long chain alkyl can have a large number of different functional groups, SAMs allow tuning the surface energy of the glass moldpate to promote controlled release of the optical component formed therein. That is, different functional groups preferably having a CTE that substantially matches that of the optical material and/or that of the moldplate material can be selectively chosen so that the optical component formed in the cavities 25 conforms to the cavity geometry during the injection/curing process and is easily released afterwards. Release layers made of any of the above-described materials can be robust and would survive multiple reuses. Moreover, when damaged, these release layers can be easily removed completely, for example, by oxygen ashing and a new layer can be applied.

Still referring to FIG. 1, the injection molding machine 30 (injection device) may include: a material hopper 32 having a pressure inlet 31; a heated barrel 11 that is heated by a heating device 12; a filling platen 15 including therein a first injection nozzle 14 for injecting lens material 13, and a second nozzle 17 for injecting filter material 16 into cavities 25. The injection molding machine 30 is preferably configured to heat the lens material 13 and filter material 16 to an appropriate molten state (preferably liquid), so that the molten lens material 13 and filter mater 16 may be injected into the mold cavities 25 in a uniform and efficient manner. To that end, the temperature of the lens material 13 and filter material 16 may be controlled by the control station 40 by regulating the heating device 12. Regulating the heating device 12 may include, for example, increasing and/or decreasing the temperature that the heating device 12 applies to heated barrel 11 such that the lens material 13 and filter material 16 are kept at a substantially steady and uniform temperature. Preferably, the temperature of the lens material 13 and filter material 16 is kept at a substantially steady-state melting point temperature in the range of 150 to 250° C.

In addition, the injection pressure of the lens material 13 and/or that of the filter material 16 may need to be regulated to promote expedited filling of the respective materials into the plurality of cavities 25. For example, when the lens material 13 is injected into the base surface 25a of cavity 25 a predetermined pressure may be required to hold (or push) the lens material 13 against the base surface 25a of the cavities 25 for at least a predetermined period of time (hold period) so as to lock-in the geometrical shape and dimensions of the lens element being formed therein. Similarly, when the filter material 16 is injected into cavities 25, a certain pressure may be required to stack said filter material 16 on top of lens material 13. In this manner, it is possible to automatically align and seamlessly integrate a lens element 50 into an optical filter 55. To provide appropriate injection pressure, a pressure inlet 31 may be implemented based on particular application requirements, such that—for example—the molten lens material 13 and filter material 16 are uniformly injected (at a predetermined pressure and speed) from the heated barrel 11 into cavities 25 through respective first and second injection nozzles 14 and 17 located in the body of the filling platen 15. To that end, the first and second injection nozzles 14 and 17 may be controlled by control station 40 to alternately open and close in accordance with the injection of the respective lens material 13 or filter material 16.

A curing device 60 is provided preferably supported by, or attached to, the filling platen 15. In this manner, injection and curing steps can be performed in an ordered sequence for each of the lens material 13 in a first instance and for filter material 16 and a subsequent instance. In the embodiment illustrated in FIG. 2, in the first instance, lens material 13 is deposited into base surface 25a of each cavity 25. The cavity 25 then passes below the curing device 60 as the moldplate 20 is moved by translation stage (S) 70 in a scanning or step mode in a first direction 35. After the curing device 60 cures the injected lens material 13, translation stage 70 advances the moldplate 20 in the first direction 35 until all selected cavities 25 have been injected with lens material 13 and all lens elements 50 have been formed therein. In the second instance, filter material 16 is injected into the each cavity 25. Each cavity 25 receives the injected filter material 16, and then passes below the curing device 60 as the moldplate 20 is moved by translation stage 70 in a second direction 36. After the curing device 60 cures the injected filter material 16, translation stage 70 moves the moldplate 20 in the second direction 36 until all selected cavities 25 have received the filter material 16 within the sidewalls 25b and on top of lens material 13.

Alternatively, the injection machine 30 can move in a scanning or step mode in said first and second directions 35 and 36, respectively, so as to rapidly and efficiently fill each cavity 25 with lens material 13 and filter material 16 in said ordered sequence. Moreover, either the moldplate 20 and/or injection machine 30 may be configured to move with respect to each other in more than one direction, preferably in three directions (e.g., along x, y and z planes) if appropriate and necessary.

In the embodiment of FIG. 2, the curing device 60 is preferably a source of electromagnetic radiation that can produce photochemical reactions, also know as "actinic radiation". For example, curing device 60 may preferably be an ultra violet (UV) light source, such as a UV laser or lamp, capable of delivering actinic radiation (pulsed or continuous) in a range from about 254 nm to 365 nm. The curing device 60 may be controlled by control station 40 so as to deliver specific power, intensity and/or duration of radiation exposure to injected lens material 13 and filter material 16. In the case that pulsed UV light is selected, the pulse duration (e.g., in the range of hundreds of microseconds per pulse), number of pulses, and other details could vary depending on the specific lens and/or filter material chosen and the geometry of the optical components being fabricated. For illustrative purposes, low intensity UV energy, in the range of about 100-300 mW either pulsed or continuous can delivered to the lens material 13 and filter material 16 for predetermined periods of time. It should be noted that by delivering low-intensity UV energy to the injected material, it is possible to prevent excessive differential thermal expansion between the optical material and the moldplate material, thus the integrated optical component being formed does not prematurely dislodge from the cavities' base surface and/or sidewalls. As a result, a high precision optical device can be readily obtained.

An advantage of pulsing the actinic radiation during curing is to minimize heat-transfer while effecting a volumetric transformation such as shrinking due to photoinduced cross-linking of the polymer chains. Both continuous and pulsed irradiation are practical and efficient, although physically the light sources may vary in spatial uniformity over different size areas of the target elements.

In other embodiments of the present invention, the curing device 60 may not be limited to a pulsed UV source alone. There are various sources of radiation that may be used as curing device 60. For example, actinic radiation from a variety of sources can be used, including commercial ultraviolet fluorescent tubes, medium, high, and low pressure mercury vapor lamps, argon glow lamps, photographic flood lamps, pulsed xenon lamps, carbon arc lamps, and the like. As long as the curing device is capable of delivering low-intensity curing energy such that an integrated optical component with high precision dimensions can be formed, any curing device can be used without departing from the teachings of the present invention.

In FIG. 2, a surface sensor 65 is also provided within the structure of injection machine 30. The surface sensor 65 is depicted as being attached to filling platen 15, but other arrangements can be devised. A surface sensor 65 can be an optional device configured to monitor and determine the level of curvature of the lens element 50 formed in the base surface 25a of cavity 25. Alternatively, surface sensor 65 may be configured to measure the depth (or thickness) of either the lens element 50 or optical filter 55. In other embodiments, surface sensor 65 may also be configured to measure parameters (such as surface roughness, focal length, transmissivity, reflectivity, alignment, spectral response, or the like) of the newly formed lens element 50 aligned with and integrated into optical filter 55. The above-mentioned parameters and possible others can be measured, for example, by a laser triangulation sensor, confocal microscopy, holography or the like, and the results of such measurements can be stored and analyzed at control station 40. Preferably, a non-contact surface sensor 65 such as a profilometer is desirable in order to prevent damage of the optical component being formed and/or the surface sensor itself.

Based on the parameters measured by the surface sensor 65, various parameters relating the injection of the optical material can be selectively controlled, so as to obtain the desired high-precision in the dimensions and spectral response of the integrated optical component being fabricated. For example, the shape and curvature of the lens element 50 can be predetermined based on one or more parameters such as the initial geometry of the moldplate cavity, the viscosity of the lens material, the temperature of the lens material and the like. Thus, after the initial stage (described above), when the lens material 13 is injected into cavities 25 and cured, the surface sensor 65 can measure selected parameters of lens element 50. If the parameters of lens element 50 meet the expected dimensions and tolerances thereof, the injection system 10 proceeds to the subsequent stage of injecting and curing the filter material 16. Alternatively, if the lens element 50 does not meet expected parameters, the lens material 13 could be could be again cured under the UV source to achieve the desired parameters, or could be discarded as defective. In this case, no filter material 16 should be injected into the cavity 25 containing the defective lens element 50. In addition, surface sensor 65 can be further configured to measure profile parameters of the newly formed optical filter 55, after the filter has been aligned with and integrated into the lens element 50. That is, it may be possible to determine weather the correct spectral response and/or appropriate alignment of the optical filter 55 has been achieved during the injection and curing processes. In this manner it can be decided whether further curing or adjustment of the integrated optical component are necessary.

Lens Element Materials

Some advantages of forming optical components by the injection molding processes of the present invention include superior optical shape control and high-precision dimensions because the optical elements are shaped the precise geometry of the moldplate cavities, rather than surface tension as in prior art reflow techniques. In FIG. 2, as described above, injection machine 30 is configured to inject lens material 13 an filter material 16 in a molten state dispensed from the filling platen 15 through the first and second injection nozzles 14 and 17, respectively, onto cavities 25.

The preferred materials for optical components, in particular for elements in the micro and/or nanometer scale may include polymers, photopolymers, glasses, sol-gels, UV-curable epoxies, resins, acrylics, cyclolefins, polycarbonates, PMMA (polymethyl methacrylate), polyimide, glass semiconductors such as $Ge_xSe_{1-x}$, and, combinations thereof. In addition, polymeric composites having a high transparency, low coefficient of thermal expansion and minimum change of coefficient of refractive index with temperature are preferable. Such polymeric composites may be made from a suitable thermoplastic polymer and index-matched glass or ceramic.

Thermoplastic polymers suitable for the composites may belong to any known class of polymers including polyvinyls, polyamides, polyesters, polyolefins, polycarbonate, polyamide, polyimide, polyesteramide, polyketones, polyetherketones and the like and mixtures thereof. Polyolefins include polyalkenes (such as, for example, polyethylene, polypropylene, polybutylene), polystyrene, and polymers containing cyclic olefin moieties. Suitable glasses or ceramics are those which closely match the selected thermoplastic in refractive index over a wide wavelength range as well as give optimal properties to the composite. Any refractive index or CTE mismatch between the glass (or ceramic) and the polymer should be kept at the lowest possible in order to obtain transparent composites that can be efficiently injected and cured during the injection molding process. In addition, the CTE of the optical material should be such that does not affect the curvature of the lens element 50 during the curing of the lens material. For this reason, it may be preferable to select optical materials that can be cured isotropically under the influence of actinic radiation. In addition, it may be preferable to select optical materials that substantially match the CTE or the moldplate material so as to prevent premature dislodging of the optical components being formed, and to achieve the high-precision dimensions desired.

Optical Filter Material

The art of making single-layer or multi-layer color filters of the type described herein is believed to be within the knowledge of those of ordinary skill in the art. Various combinations of filter materials, layer thicknesses, and the like will apparent to those skilled in the art. It should be noted, however, that in at least one embodiment of the present invention, it may by preferable to select filter materials that with a CTE that substantially matches the CTE of the lens material. Matching the thermal properties of the lens material 13 and the filter material 16 may facilitate and promote easy alignment and integration of the lens element 50 into the optical filter 55. For this reason, in at least some embodiments of the present invention, it may be advantageous to use the same material for the lens element 50 and for the optical filter 55, with the only requirement that the filter material 16 be doped to serve as a chromatic filter. In this manner, either single-layer or multi-layer optical filter may be readily achievable with different types of doping (e.g., one type of doping per each color or layer of filter).

In addition, as it is know in the art, at least one optical buffer layer can be integrated with the optical filter 55, above the lens element 50. An optical buffer layer is typically provided in a filter to adjust the filter bandpass or to attenuate light intensities. FIGS. 3A to 3D illustrate examples of how an optical buffer may be formed an integrated into the optical filter 55. In those figures, the optical buffer layer 56 of the optical filter 55 is preferably formed from a light transmissive material. Specifically, the material for formation of the optical buffer layer 56 should preferably not absorb light, but some absorption of light in some wavelength range may be acceptable, for example, for achieving color compensation or increasing reflectivity. To that end, optical buffer layer 56 would have a different doping (refractive index) than either of the layers optical filter 55. As a result, the same materials (e.g., polymers or photopolymerizable materials) described under the "Lens Element Materials" section can be used, but with chromatophores and/or dyes that would provide the appropriate spectral response to the optical filter.

It should be noted that the doping, thickness, or both for the filter layers can be adjusted to compensate for color nonuniformity in the desired application. For example, if the light source in an imaging application is known to be deficient in blue, then the filter can be designed to block appropriate amounts of red and green so that the overall effect is balanced; this achieves the so-called "white balance" referred to in the industry. The ability to quickly manufacture such integrated lens-filter structures and tailor their color response to specific applications can significantly increase the yield of these integrated optical components and supports low cost manufacturing for microlens and filter applications.

Process for Fabrication of Injection Molded Integrated Optical Components

FIG. 4 shows a flow chart illustrating example method steps for the fabrication of integrated optical components by an injection molding process 400, as contemplated by at least one embodiment of the present invention. FIG. 4 will be described in connection with FIGS. 3A to 3D. The method starts at step S402, by providing an appropriate moldplate (e.g., moldplate 20 in FIG. 2 and FIG. 3) made of a predetermined moldplate material and having a plurality of cavities 25 configured to receive injected lens material 13 on the base surface 25a and filter material 16 within the sidewalls 25b of the cavities 25. Preferred moldplate materials, such as glass, metals or metal alloys are fully discussed in reference to FIG. 1 above, and—in particular—in copending patent application Ser. No. 12/603,565, which is incorporated herein by reference for all purposes. Preferably, each of the plurality of cavities 25 is configured to have a base surface 25a of predetermined shape (e.g., predetermined geometry) that substantially corresponds to a profile of the desired lens element 50 to be formed therein. Similarly, the sidewalls 25b are configured to provide the structural profile parameters for the optical filter 55 to be formed therein. As noted above, a variety of optical shapes and profiles, particularly directed to micro-optical components, can be provided depending on specific application requirements. However, this approach can be applicable to any type of optical element structure, including larger optical components used in mobile camera and video phones, projection systems, or any other application which uses such optical elements whether individually or as an array. Examples of applications for arrayed optical elements of the type described in this application are (a) a microlens array integrated with an optical filter array for liquid crystal displays (LCD), or (b) a microlens array integrated with an array of RGB filters and an array of LEDs for the DLP display system.

At step S404, an appropriate lens material 13 is injected through first injection nozzle 14 into the plurality of cavities 25 in accordance with preferred injection molding parameters. Preferred parameters may include a predetermined lens material temperature, flow rate and pressure for injecting the lens material, viscosity of the lens material and the like. For example, it may be desirable that the lens material 13 be maintained in a molten state (liquid if possible and preferably above the glass transition temperature). This can be achieved by controlling the temperature of the injection molding machine 30, as described in previous sections of this specification. In addition, optimal behavior of the lens material 13 (e.g., material stress levels caused by thermal expansion/contraction) may be predetermined by numerical simulation and/or empirical experimentation so at to more precisely control parameters such as temperature, injection flow rate and pressure, as well as viscosity of the optical material. Once the lens material 13 has been injected into the base surface 25a of at least one cavity 25, the injected lens material 13 is slowly cured with actinic radiation so that the cured material conforms to the geometric shape of base surface 25a and forms therein the lens element 50, as illustrated in FIG. 3A. As previously discussed, cavities with different geometrical shapes may be provided to obtain lens elements 50 with different optical profiles. This step may be preferably repeated for each cavity 25 selected to be utilized in the injection process.

In order to ensure that the appropriate physical or optical profile (e.g., curvature, thickness, index of refraction) has been achieved, at step S405, a surface sensor 65 (in FIG. 1) is used to measure the surface shape of the lens element 50 formed in the base surface 25a of cavities 25. If the lens element 50 substantially matches the expected optical profile (e.g., a predetermined optical profile) within an acceptable tolerance (YES at step S405), the process advances to step S406. Alternatively, if the lens element 50 is not within the acceptable tolerance (NO at step S405), the process advances to step S407.

At step S407, control station 40 may activate translation stage 70 so as to reposition the lens element 50 under curing device 60. In this position, further curing and/or pressure may be applied to lens element 50 so as to attempt to adjust the optical profile of the lens element 50 to expected parameters. Steps S405 to S407 may be successively repeated until at least one lens element 50 is accepted as valid or discarded as defective.

Continuing to refer to FIG. 4, after at least one lens element 50 has been deemed acceptable at step S405, the process 400 flows to step S406. At step S406, control station 40 controls the second injection nozzle 17, so as to inject filter material 16 into selected cavities 25. Preferably, filter material 16 is injected only into those cavities containing lens elements 50 that have already been deemed acceptable at step S405. Filter material 16 is deposited into cavities 25, such that the injected filter material 16 is contained within sidewalls 25b and resides right above the newly formed lens element 50. Preferably, the filter material 16 is in physical contact with the already formed lens element 50. Once an appropriate amount of filter material 16 has been deposited in the selected cavity 25, translation stage 70 moves moldplate 20 such that the curing device 60 can deliver the required curing energy to the injected filter material 16. As previously discussed, low-intensity UV energy delivered in several long pulses or continuous radiation may be preferable in order to obtain an optical filter 55 with high-precision parameters. Step S407 can be performed at least once to form a single-layer optical filter (not shown), or it can be performed repeatedly to form a multilayered optical filter 55 having a plurality of chromatic filter layers. For example, FIG. 3B illustrates a multilayer optical filter 55 having filter layers 55a and 55b, and an optical buffer layer 56. Should step S406 continue to be performed, further filter layers can be built upon the already formed ones. FIG. 3C illustrates an example in which a multilayered optical filter 55 includes layers 55c and 55d, as well as an further optical buffer layer 56 in addition to those already formed at the stage illustrated in FIG. 3B. In the same manner, step S406 can be performed to form one or more optical buffer layers 56, as illustrated in the above-referenced FIGS. 3B and 3C. As a result, an integrated optical component including lens element 50 and the optical filter 55 is readily formed in a cavity 25. FIG. 3D illustrates the resultant integrated optical component 101. In FIG. 3D, integrated optical component 101 includes a lens element 50 and a multilayered optical filter 55 monolithically integrated into each other. Multilayered optical filter 55 may include any number n of filter layers (e.g., 55a, 55b, 55c ... to 55n), and one or more optical buffer layers 56, such that each filter layer serves as a chromatic filter preferably responsive to a different wavelength ranges. Accordingly, at least one embodiment of the present invention provides a particular distinction from prior art processes in that with the processes disclosed herein one can obtain high-precision integrated optical components 101 that monolithically integrate and readily align at least two optical elements in a single step, rather than separately fabricating and subsequently assembling those elements.

As it will be evident to persons of ordinary skilled in the art, in order to build a multilayered optical filter, filter material 16 should be preferably doped with selected dopants appropriate to the specific spectral characteristic desired in an optical filter 55. Similar caveats apply to the formation of the one of more optical buffer layers 56. That is, each optical buffer layer can be tailored, for example, with different doping to adjust the filter's bandpass differently, as it is known in the art. As a result, it is possible to create multi-spectral optical filters integrated into lens elements where, for example, each layer 55a, 55b, 55c ... 55n of the multilayered optical filter 55 would be responsive to a different wavelength range. Wavelength division multiplexing devices such as the mux for combining wavelengths and demux for separating wavelengths will enjoy the advantage of a coupler which both collimates or collects light as well as providing spectral tailoring with integrated spectral filters that can concurrently compensate for the light source having different intensities or energies at the different wavelengths it emits, allowing uniformity of energy or pre-compensation for transmission losses in the long-haul fiber at different wavelengths. Similar compensator effects may be desirable in display monitors using microlenses for matrix substrates to allow redistribution of energies at the different wavelengths received at pixel locations.

Moreover, by performing the above-described injection and curing steps S404 to S406 in the ordered sequence indicated, it is possible to have the single-layer or multilayered optical filter 55 automatically aligned with—and monolithically integrated into—the lens element 50, so as to form complex integrated optical structures, as shown in FIG. 3D.

Returning to FIG. 4, after the optical filter 55 is formed in step S406, or preferably after each layer of the optical filter is formed, the process 400 advances to step S408. At step S408, translation stage 70 positions moldplate 20 such that surface sensor 65 may measure the different parameters (e.g., geometric or spectral parameters) of the optical filter 55 and/or lens element 50. As described above in reference to FIG. 2, various parameters can be tested to determine whether the optical filter 55 meets required spectral characteristic and/or alignment requirements. Therefore, at step S408, if spectral characteristics and required parameters of optical filter 55 and/or lens element 50 are not met (NO at step S408), the process advances to step S409.

At step S409, an attempt can be made to correct the spectral characteristics or other parameters of the integrated optical component 101 by, for example, further curing the optical component. Alternatively, at step S409, the integrated optical component 101 can be discarded as defective.

However, if at step S408, the integrated optical component meets desired spectral characteristics and other parameters, process 400 flows onto step S410. At step S410, a decision can be made as to whether or not a post injection process will take place. As fully described below, if at step S410 it is decided that a post injection process should take place (YES at step S410), the process 400 advances to FIG. 5. Alternatively (NO at step S410), the process advances to step S411.

A post injection process may be required, for example, when the newly formed integrated optical component 101 (see FIG. 3D) requires to be transferred onto an optoelectronic device. Specifically, it is contemplated by the present invention, that the above-described injection processes may be applicable to the fabrication of monolithically integrated optical components in the micro or nanometer scale. Micro or nanometer scale optical components are often fabricated as arrays of elements suitable for wafer-scale processing. Accordingly, such micro or nanometer optical elements may need to be transferred to appropriate wafer-scale processing, as more fully described in the following sections in reference to FIGS. 5-7.

Alternatively, since the above-described injection process may be applicable to the fabrication of optical devices in macro scale. For example, monolithically integrated optical devices such as lenses and filters (lens-filters) for standalone imaging electronic devices such as cameras, projectors, scanners and the like. In the case that the newly formed integrated optical component 101 is in the macro scale, no additional steps may be required after the optical component has been aligned and integrated, as described above. Accordingly, the process 400 advances to step S412 separation (i.e., demolding) processes may take place. Once the newly formed optical component has been removed from the moldplate cavities, the process ends.

It should be noted that in the above-described injection molding process, the moldplate cavities may be with or without a conformal coat of release layer. The main objective of using the coat of release layer is to facilitate separation of the newly formed optical element from the cavities of the moldplate. However, it may be possible to form such complexly integrated optical components without the use of a release layer. A complete description concerning the use of a release layer, or prevention thereof, is presented in copending patent application Ser. No. 12/603,565, which is incorporated herein by reference for all purposes.

Post Injection Processes

Figure 5:
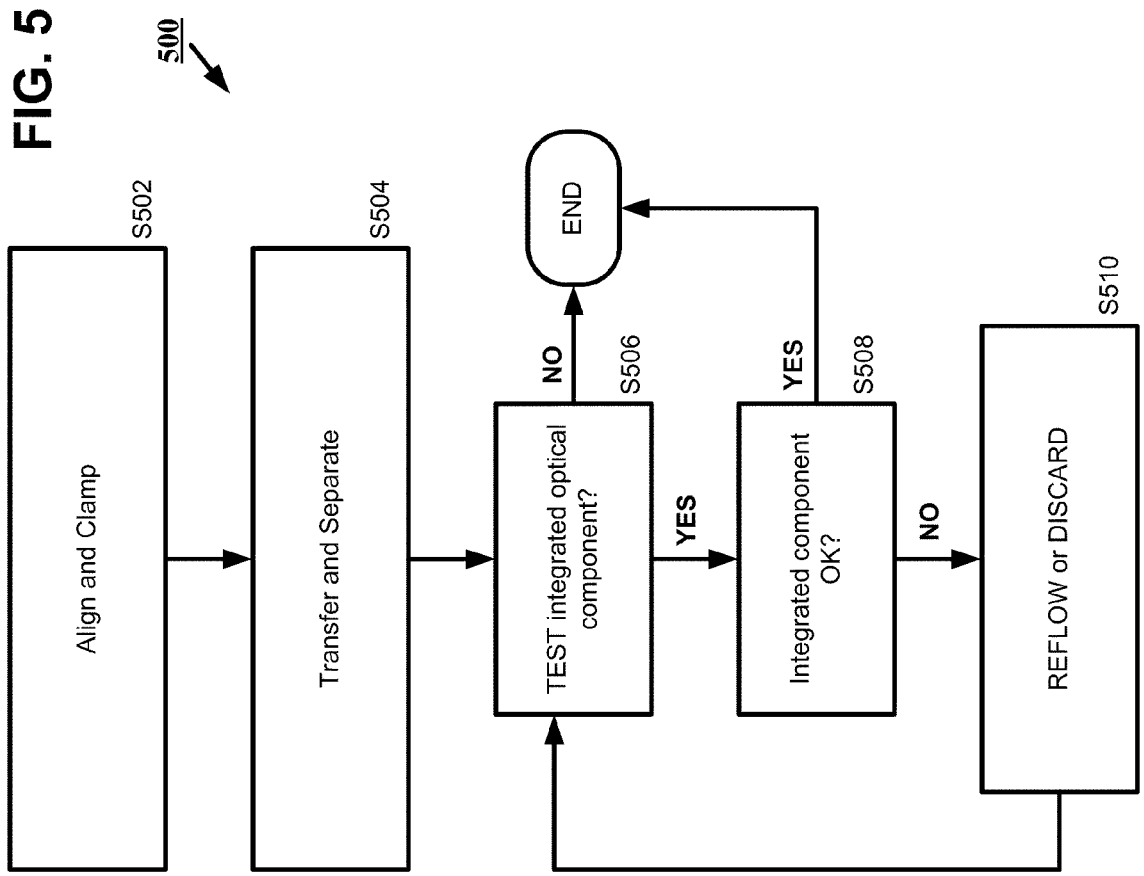
FIG. 5 illustrates exemplary steps for a post injection process, in accordance with an embodiment of the present invention.

FIG. 5 illustrates exemplary steps for a post injection process, in accordance with an embodiment of the present invention. A post injection process may be desirable or even required, for example, in instances in which the newly formed integrated optical components 101 are of the micro or nanometer scale, and a transfer of the optical component onto a wafer-scale device is appropriate. For example, if the newly formed optical component is a microlens integrated into a color microfilter, such a device may be transferred onto an active optoelectronic device such as a photodiode, a photo detector or the like, so that wafer-scale assembly may take place. Alternatively, a post injection process may be desirable for inspecting the newly formed optical component to further confirm that the desired optical shape and other properties have been correctively achieved.

In FIG. 5, post injection process 500 flows from step S410 of process 400. At step S502, after the optical component has been cured, the moldplate 20 (in FIG. 2) containing therein the newly formed optical components may be aligned with, and clamped onto, an alignment tool 600 using conventional photolithographic techniques, as shown by FIGS. 6A and 6B, respectively. Specifically, FIGS. 6A and 6B show the alignment of moldplate 20 containing an array of newly formed integrated optical components 101 with an alignment tool 600 and a clamping tool 605 with the use of alignment keys 608.

At step S504, as illustrated in FIGS. 6C and 6D, the array of newly formed optical components 101, in this case microlenses 61 monolithically integrated into optical filters 55, are transferred onto an array of active optoelectronic devices 610 (FIG. 6C), and subsequently separated therefrom (FIG. 6D) with the use of a chuck device, a vacuum device or other mechanical tools, as it is know to those skilled in the art.

At step S506, after the newly formed optical components have been transferred, the post injection process 500 may be used for testing the newly formed optical component(s). If testing is selected (YES at step S506), the process advances to step S508, where appropriate testing is performed and a determination is made as to whether or not the optical components meet predefined parameters such as curvature, diameter, transmittance, refractive index and the like. If at step S508 the optical components meet the predefined parameters (YES at S508), the optical components may be marked as tested/approved and the process ends.

Alternatively, if at step S508, the newly formed optical components do not meet the predefined parameters (NO at step S508) the process advances to step S510. At step S510, depending on the level of error (e.g. tolerance permitted) in the newly formed optical components, an attempt can be made to correct any errors and re-test the optical component, or the optical components may simply be discarded—if the error is greater that a maximum tolerance permitted. An example of error correction during testing may include submitting the newly formed optical component to a conventional reflow technique so as to modify or improve predefined parameters such as curvature, diameter or index of refraction. In this case, the optical component may successively be determined whether to be tested or not at step S506 until the optical components meet the predefined parameters or are discarded.

FIG. 7 shows an exemplary testing arrangement 700 for testing predefined parameters of a newly formed array of integrated optical components 101. In the arrangement of FIG. 7, a plurality of microlenses 71 monolithically integrated into optical filters 51 have been transferred onto a testing platform 701; for example, a transparent wafer-scale substrate (target device). An array of different wavelength sources 710 (e.g., laser diodes) may be provided in correspondence with an array of wideband photodetectors 705. In such an arrangement of FIG. 7, various testing procedures may be performed so as to test if the array integrated optical components 101 having the microlenses 71 and optical filters 55 monolithically integrated into single components meets predefined parameters. For example, the optical components 101 may be tested for focusing distance, wavelength response, transmittance levels and the like. More specifically, in this particular arrangement, the spectra response to the multilayered optical filters 55 may be easily characterized.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The foregoing embodiments and examples were chosen and described in order to best explain the principles of the invention and the practical application, and to enable others of ordinary skill in the art to understand the invention for various embodiments with various modifications as are suited to the particular use contemplated.

What is claimed is:

1. A method for injection molding optical filters integrated with lens elements, the method comprising:
   providing a moldplate having an array of cavities, each of said cavities having a base surface and sidewalls, said base surface having a geometric profile corresponding to a predetermined lens profile;
   injecting a lens material into at least one cavity of said array of cavities such that said lens material forms a lens element having said predetermined lens profile; and
   injecting a filter material into said at least one cavity and above said lens material such that said filter material forms an optical filter stacked onto said lens element,
   wherein said optical filter is aligned with and monolithically integrated into said lens element,
   wherein said optical filter includes an optical buffer layer.

2. The method according to claim 1, wherein injecting the filter material includes injecting a plurality of layers of said filter material such that said optical filter includes a multilayered filter having two or more layers of said filter material.

3. The method according to claim 2, wherein each layer of said multilayered filter is a monochromatic filter responsive to a different wavelength range.

4. The method according to claim 3, further comprising:
   forming at least one optical buffer layer above said lens element.

5. The method according to claim 3, wherein said multilayered filter includes an RGB (red, green and blue) filter.

6. The method according to claim 1, further comprising:
   depositing a release layer on said base surface and sidewalls of said cavities prior to injecting the lens material, and
   curing with actinic radiation said release layer on said base surface and sidewalls of said cavities.

7. The method according to claim 1, wherein:
   injecting said lens material into said at least one cavity includes depositing the lens material on said base surface such that the lens material conforms to the geometric shape of said base surface.

8. The method according to claim 7, wherein forming the lens element includes curing with actinic radiation the lens material contained at said base surface such that the formed lens element substantially matches the predetermined lens profile.

9. The method according to claim 8, wherein said filter material is injected into said at least one cavity, after the lens element has been formed therein.

10. The method according to claim 9, further comprising:
curing with actinic radiation the injected lens material such that the optical filter is formed within the sidewall of said at least one cavity and above said lens element.

11. The method according to claim 10, wherein actinic radiation includes ultraviolet (UV) light, and wherein curing includes exposing said lens material and said filter material, respectively, to low intensity UV light.

12. The method according to claim 1, further comprising:
using at least one alignment key to align said moldplate to a target device; and
transferring the optical filter integrated into said lens element from the moldplate onto said target device.

13. The method according to claim 1, wherein the lens element includes at least one of a refractive or diffractive lens, a mirror, a refractive or diffractive grating, an interferometric device, a mode transformer for waveguide or fiber-optic couplers, a variable or fixed optical attenuator, a polarizer, and a wavelength splitter.

14. The method according to claim 1, wherein the lens material is a polymer material or a photopolymerizable material, and wherein the filter material is a polymer material doped to serve as a chromatic filter.

15. An injection molding system for injection molding of optical filters integrated with lens elements, the injection molding system comprising:
a moldplate having an array of cavities, each of said cavities having a base surface and sidewalls, said base surface having a geometric profile corresponding to a predetermined lens profile;
an injection device configured to inject a lens material and a filter material into at least one cavity of said array of cavities of said moldplate, and
a curing device configured to cure the injected lens material and the injected filter material such that the cured lens material forms a lens element having said predetermined lens profile and the cured filter material forms an optical filter stacked onto the lens element in said at least one cavity,
wherein said optical filter is aligned with and monolithically integrated into said lens element,
wherein said optical filter includes an optical buffer layer.

16. The system according to claim 15, wherein said curing device includes a source of actinic radiation, and
wherein said curing device is configure to cure said lens and filter materials in an ordered sequence such that the curing device first cures the lens material and later cures the filter material injected into the cavities with a low-intensity UV light.

17. The system according to claim 15, wherein the moldplate is manufactured of material including at least one of metal, glass, silicon graphite, polyimide or combinations thereof.

18. The system according to claim 15, wherein the optical material includes at least one of a polymer material and a material susceptible to photopolymerization.

19. The system according to claim 15, wherein each of the lens material and the filter material contains polymers materials having different indices of refraction.

20. The system according to claim 15, wherein said optical filter includes a multilayered optical filter, and wherein each of the layers in said multilayered optical filter contains a polymer material configured to block a different range of wavelengths.

21. The system according to claim 15, wherein said moldplate includes a multistage mold having a bottom portion and an upper portion which are separable from each other, and
wherein said base surface is formed in the bottom portion and said sidewalls are formed in the upper portion.

22. The system according to claim 15, wherein the moldplate further includes a conformal coat of release layer deposited on said base surface and sidewalls of said array of cavities, and wherein said curing device cures the release layer prior to curing the lens and filter materials.

23. The system according to claim 15, further comprising:
a target device; and
a transfer tool for transferring the optical filter integrated into the lens element from the moldplate onto the target device, wherein at least one alignment key is used to align said moldplate to the target device.

24. An array of injection molded micro-optical elements comprising:
an array of microlens elements formed of a first polymer material; and
an array of multilayered optical filters formed of a second polymer material, said array of multilayered optical filters being aligned with and monolithically integrated into said array of microlens elements,
wherein each of the layers in said array of multilayered optical filters contains the second polymer material configured to block a different range of wavelengths,
wherein said optical filters include an optical buffer layer.

* * * * *